(12) United States Patent
Aberle (10) Patent No.: US 11,760,198 B2
(45) Date of Patent: Sep. 19, 2023

(54) MAGNETIC TETHER SWITCH

(71) Applicant: Ryan D. Aberle, Somerset, KY (US)

(72) Inventor: Ryan D. Aberle, Somerset, KY (US)

(73) Assignee: Ryan D. Aberle, Somerset, KY (US)

( * ) Notice: Subject to any disclaimer, the term of this patent is extended or adjusted under 35 U.S.C. 154(b) by 33 days.

(21) Appl. No.: 17/776,688

(22) PCT Filed: Nov. 13, 2020

(86) PCT No.: PCT/US2020/060569
§ 371 (c)(1),
(2) Date: May 13, 2022

(87) PCT Pub. No.: WO2021/097333
PCT Pub. Date: May 20, 2021

(65) Prior Publication Data
US 2022/0396145 A1    Dec. 15, 2022

Related U.S. Application Data

(60) Provisional application No. 62/954,308, filed on Dec. 27, 2019, provisional application No. 62/936,284, filed on Nov. 15, 2019.

(51) Int. Cl.
*B60K 28/04* (2006.01)
*B60L 3/02* (2006.01)
(Continued)

(52) U.S. Cl.
CPC ............... *B60K 28/04* (2013.01); *B60L 3/02* (2013.01); *B62J 27/00* (2013.01); *H01H 9/0005* (2013.01);
(Continued)

(58) Field of Classification Search
CPC . B60K 28/04; B60L 3/02; B62J 27/00; H01H 9/0005; H01H 2036/0086; H01R 13/6205
See application file for complete search history.

(56) References Cited

U.S. PATENT DOCUMENTS 3,161,742 A    12/1964 Bagno
3,273,091 A    9/1966  Wales, Jr.
(Continued)

FOREIGN PATENT DOCUMENTS

GB    2541157 A    3/2018
TW    M283308 U   12/2005
WO    0145126 A1   8/2013

OTHER PUBLICATIONS

ISA/WO, "International Search Report and Written Opinion of the International Searching Authority," issued in connection with Int'l Appl. No.. PCT/US2020/060569, dated Mar. 4, 2021 (17 pages).

(Continued)

*Primary Examiner* — Thanh Tam T Le
(74) *Attorney, Agent, or Firm* — Holland & Hart LLP (57) ABSTRACT

A magnetic tether switch for equipment or vehicles is described. The magnetic tether switch may include a base having a first magnetic assembly. The first magnetic assembly may include a magnet and a first magnetic flux return component, or multiple magnets with reversed polarization directions. The magnetic tether switch may include a cap including a second magnetic assembly. The second magnetic assembly may include a magnet and a magnetic flux return component, or multiple magnets with reversed polarization directions. Alternatively, the second magnetic assembly may be composed of a ferrous material. The base may include a circuit with multiple contacts, where attaching the cap to the base may connect or disconnect the contacts to each other by moving the magnet within the base by magnetic attraction from the cap.

20 Claims, 9 Drawing Sheets (51) Int. Cl.
*B62J 27/00* (2020.01)
*H01H 9/00* (2006.01)
*H01R 13/62* (2006.01)
*H01H 36/00* (2006.01)

(52) U.S. Cl.
CPC . *H01R 13/6205* (2013.01); *H01H 2036/0086* (2013.01)

(56) References Cited

U.S. PATENT DOCUMENTS

| | | | |
|---|---|---|---|
| 3,283,274 A | 11/1966 | De Falco | |
| 3,284,593 A | 11/1966 | Hawkins | |
| 3,579,159 A | 5/1971 | Posey | |
| 3,801,767 A * | 4/1974 | Marks | H01H 36/00 200/543 |
| 4,317,969 A * | 3/1982 | Riegler | H01R 13/6205 200/51.09 |
| 4,653,503 A * | 3/1987 | Heath | A61B 5/274 600/391 |
| 5,877,664 A | 3/1999 | Jackson, Jr. | |
| 5,909,100 A * | 6/1999 | Watanabe | B60L 53/126 320/108 |
| 9,196,979 B2 * | 11/2015 | Kim | H01R 13/64 |
| 9,300,081 B2 * | 3/2016 | Rudisill | H01R 11/30 |
| 9,941,627 B2 * | 4/2018 | Esmaeili | H01R 13/5213 |
| 10,297,950 B2 * | 5/2019 | Wei | A41D 13/0051 |
| 10,439,411 B2 * | 10/2019 | Narayanasamy | H02J 7/0045 |
| 10,566,734 B1 * | 2/2020 | Pabouctsidis | H01R 13/6205 |
| 2007/0072442 A1 | 3/2007 | DiFonzo et al. | |
| 2013/0200964 A1 | 8/2013 | Woods | |

OTHER PUBLICATIONS

ISA/WO, "International Preliminary Report on Patentability," issued in connection with Int'l Appl. No.. PCT/US2020/060569, dated Feb. 2, 2022 (6 pages).

* cited by examiner

MAGNETIC TETHER SWITCH

CROSS REFERENCES

The present application for patent is a 371 national phase filing of International Patent Application No. PCT/US2020/060569 by ABERLE, entitled "MAGNETIC TETHER SWITCH," filed Nov. 13, 2020, which claims the benefit of U.S. Provisional Patent Application No. 62/936,284 by ABERLE, entitled "MAGNETIC TETHER SWITCH," filed Nov. 15, 2019, and claims the benefit of U.S. Provisional Patent Application No. 62/954,308 by ABERLE, entitled "MAGNETIC TETHER SWITCH," filed Dec. 27, 2019, each of which is expressly incorporated by reference herein.

BACKGROUND

Field of Invention

The present Application relates to a magnetic tether switch for equipment or vehicles.

Relevant Background

Safety tethers are used for equipment or vehicles to ensure that the equipment or vehicle will shut off or stop if the operator is not in position to operate the equipment or vehicle safely (e.g., thrown from the vehicle). Generally safety tethers have a mechanical connection between a cap or plug and a base attached to the equipment or vehicle that disconnects when sufficient force is exerted on the cap or plug. However, mechanical plugs or caps have disadvantages in adverse environments including snow or muddy conditions. For example, plastic or rubber ridges can become clogged with snow, ice, or mud, and may be difficult to clean out in the field. Magnetic tether switches have been used in some applications, but generally do not provide sufficient disconnect force for most applications.

SUMMARY

A magnetic tether switch for equipment or vehicles is described. The magnetic tether switch may include a base comprising a first housing having a top side and a first magnetic assembly at least partially within the first housing. The first magnetic assembly may comprise a first magnet and a first magnetic flux return component. The magnetic tether switch may include a cap comprising a second housing having a bottom side and a second magnetic assembly at least partially within the second housing. The second magnetic assembly may comprise a second magnet and a second magnetic flux return component. Alternatively, the second magnetic assembly may be composed of a ferrous material. The first housing may comprise a circuit comprising a plurality of contacts, wherein the first magnetic assembly connects the plurality of contacts together in one of a first state or a second state and disconnects the plurality of contacts from each other in the other of the first state or the second state, the first state corresponding to the cap being magnetically attached to the base and the second state corresponding to the cap being detached from the base, and a state retention component for holding the first magnetic assembly in the second state when the cap is not magnetically attached to the base.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to a magnetic tether switch. The described magnetic tether switch may be used in a variety of applications including snowmobiles, all-terrain vehicles (ATVs), utility task vehicles (UTVs), motorcycles, personal watercraft, or any other recreational vehicle. Although described in the context of a vehicle, the described magnetic tether switch may be used for equipment or machinery for shutoff when an operator is no longer in position to operate the machinery safely.

Generally safety tethers for vehicles have a mechanical coupling between a tether that is attached to the operator and a base attached to the vehicle. The mechanical coupling may be achieved with a cap or plug, which may have mechanical protrusions or recesses that mate with corresponding structures on the base. When attached, the cap or plug may open or close an electrical connection (e.g., via a mechanical switch or a reed switch). Such systems may operate in a normally open (NO), or normally closed (NC) mode, where NO means that when the cap is attached to the base the electrical connection is open and NC means that when the cap is attached to the base the electrical connection is closed. The vehicle detects the state of the electrical connection and shuts off the power to the vehicle (e.g., shuts off the engine) when the electrical connection is not in the normal or operational state.

Existing mechanical safety tethers have a number of drawbacks including susceptibility to clogging in harsh environments (e.g., snow, ice, mud), slow reattachment, and inconsistent disconnect force. For example, mechanical safety tethers for snowmobiles may become clogged with snow and ice, and may be difficult to clean out in the field, especially with winter gloves worn by snowmobile operators. In addition, mechanical safety tethers may require a large amount of force to reattach, which may be challenging for some users or may take longer than desired in some situations like racing. Disconnect force can vary for mechanical tethers for a variety of reasons including dependence on temperature, angle of disconnect force, and/or wear between mating surfaces (couplings). For example, the force required to disconnect some mechanical safety tethers at an angle of 45 degrees or greater from the normal to the base may be reduced by half or more, increasing the number of inadvertent vehicle stops.

Some magnetic tether switches have been used, however they typically have very low disconnect force. For example, the operational disconnect force for recreational vehicle safety tethers is generally greater than 5 lbs., and may be desired to be greater than 10 or 15 lbs. Existing magnetic tether switches have not achieved this level of disconnect force and have thus been restricted to light-duty applications such as light equipment or small vehicles not designed to be used off-road or in extreme or harsh environments.

Recently, magnetic technology has improved to the point that magnets strong enough to achieve the disconnect force desired for recreational vehicles are available. For example, N52 grade rare-earth neodymium magnets can be used to achieve a high disconnect force. In addition, development of some Alnico magnets (e.g., magnets made of an alloy of Aluminum, Nickel, and Cobalt) has progressed to achieve a high enough magnetization (e.g., maximum energy product) to achieve high disconnect force between two magnets. However, use of high-strength magnets that can achieve a high disconnect force results in the magnets attracting each other from several inches away, and slamming together rapidly. This is disconcerting to operators and may lead to pinched fingers or cracking of the safety tether assembly. In addition, a cap attached to a tether with a high-strength magnet may stick to other ferrous objects, which may be frustrating to operators trying to use the safety tether.

The magnetic tether switch described herein achieves high disconnect force without the disadvantages of existing mechanical or magnetic tether switches. According to various aspects, the magnetic tether switch described herein applies magnet assemblies in one or both of the cap and base that have low magnetic field reach. For example, the magnetic assembly in the cap or base may include a high strength magnet (e.g., rare-earth neodymium magnet, high strength Alnico magnet) with a flux return component (e.g., ferrous cap) that limits the reach of the magnetic flux. In some cases, the cap may be designed to not stick to unwanted ferrous objects. For example, the cap may include a rim that extends below a bottom side of the cap and a magnet and flux return component that has a magnetic strength at the depth of the rim that is not significantly higher than the weight of the cap. Thus, the cap will not readily stick to ferrous objects under its own magnetic field.

Figure 1:
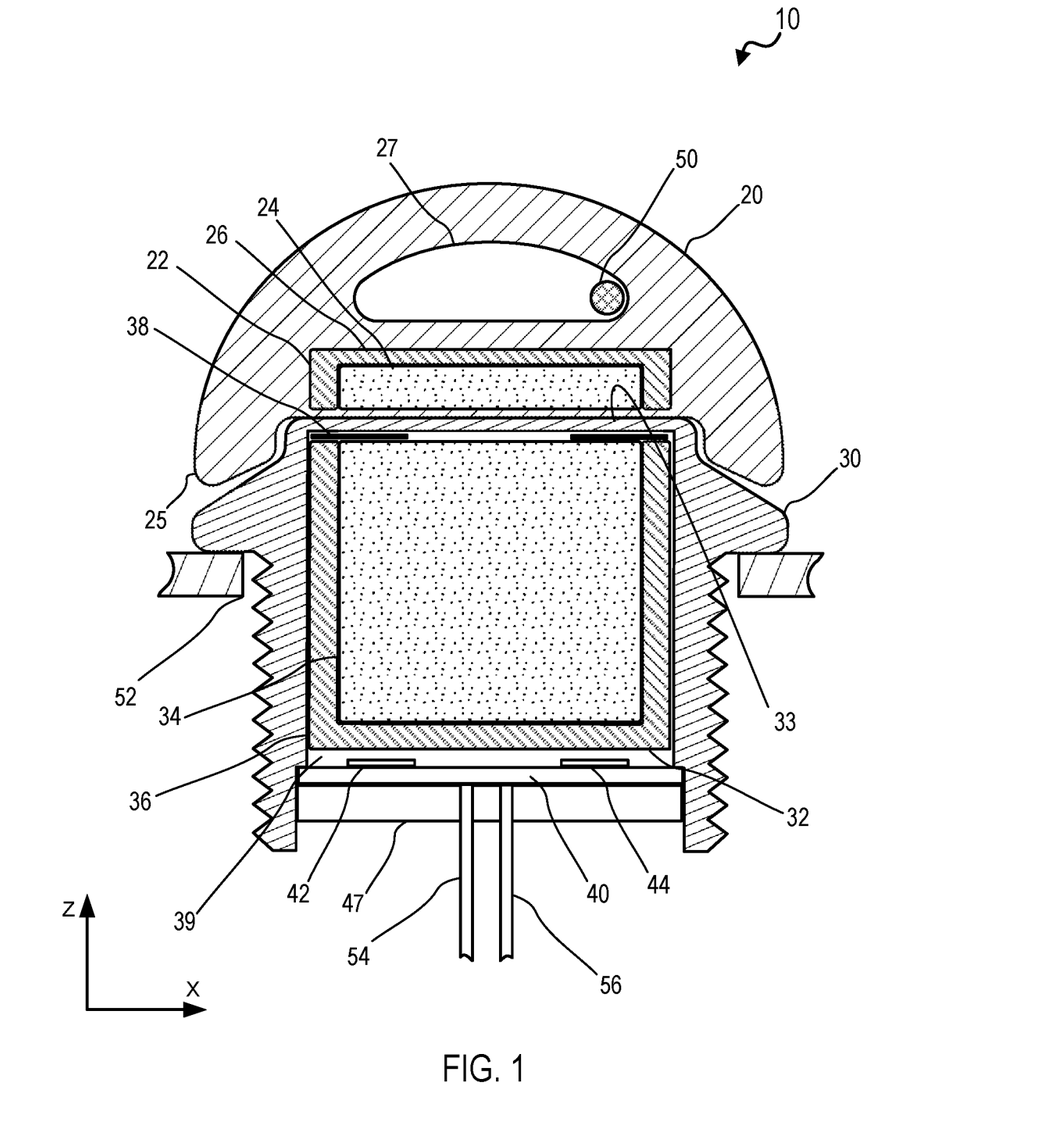
FIG. 1 illustrates a cross-section of a magnetic tether switch, according to various aspects of the disclosure.

FIG. 1 illustrates a cross-section of a magnetic tether switch 10, according to various aspects of the disclosure. The illustrated magnetic tether switch includes a cap 20 and a base 30. The cap 20 may be attached to an operator via a tether 50, which may be a cord, leash, strap, or cable. The base 30 may include a first magnetic assembly 32, and the cap 20 may include a second magnetic assembly 22.

Base 30 may be installed in an opening or cavity 52 of a machine, equipment, or vehicle by threading the base 30 into the opening or cavity 52, or by use of a lock-ring threaded onto base 30 behind the portion of the machine, equipment, or vehicle forming the opening or cavity 52. Base 30 may be formed of metal (e.g., a non-ferrous metal such as aluminum) or plastic, and may include a cavity 39 for the first magnetic assembly 32 and a state retention component 38. The first magnetic assembly 32 may include a first magnet 34 and a first flux return component 36. The first magnet 34 may be, for example, a disk or cylinder magnet having poles oriented vertically (e.g., with a North (N) magnetic pole oriented at the top of the magnet and a South (S) magnetic pole oriented at the bottom of the magnet). The first magnet 34 may be a rare-earth neodymium magnet (e.g., N52 grade) or high-strength Alnico magnet. The first flux return component 36 may be a cup around the first magnet 34 and may be formed of a ferrous material such as iron or steel (e.g., mild/low carbon steel). The first flux component 36 may reduce the magnetic reach of the first magnet 34 by providing a return for magnetic flux, thus reducing the projection of flux from the first magnet 34 (e.g., in the positive dimension of Z axis).

As illustrated in FIG. 1, state retention component 38 may be a spring. At the bottom of the cavity 39, the base 30 may have a backing plate 40. The backing plate 40 may have a first contact 42 and a second contact 44. The cavity 39 may allow movement of the first magnetic assembly 32 up and down (along the Z axis in FIG. 1), although in the absence of magnetic force the spring 38 may hold the first magnetic assembly 32 away from the top side 33 of the base 30 (e.g., resting on the first contact 42 and second contact 44 of the backing plate 40). The spring 38 may be a leaf or wave spring. In one example, the spring 38 is a circular wave spring made from spring steel. However, in some examples the spring 38 may be made of other ferrous or non-ferrous materials (e.g., plastic, elastomer, carbon fiber). The backing plate 40 may include, for example, a printed circuit board (PCB) having the first contact 42 and second contact 44, as well as connection traces to couple the first contact 42 and the second contact 44 with tether connections 54 and 56, respectively. The backing plate 40 may be held in place by potting material 47, which may be, for example, an elastomer or epoxy resin.

The cap 20 may be formed of metal (e.g., a non-ferrous metal such as aluminum) or plastic, and may be formed to completely enclose the second magnetic assembly 22. The second magnetic assembly 22 may be fixed within cap 20 (e.g., not movable within the cap 20). The second magnetic assembly 22 may include a second magnet 24 and a second flux return component 26. The second magnet 24 may be, for example, a disk or cylinder magnet having poles oriented vertically (e.g., with a North (N) magnetic pole oriented at the top of the magnet and a South (S) magnetic pole oriented at the bottom of the magnet, or vice versa). The second magnet 24 may be a rare-earth neodymium magnet (e.g., N52 grade) or high-strength Alnico magnet. The second flux return component 26 may be a cup around the second magnet 24 and may be formed of a ferrous material such as iron or steel (e.g., mild/low carbon steel). The second flux component 26 may reduce the magnetic reach of the second magnet 24 by providing a return for magnetic flux, thus reducing the projection of flux from the second magnet 24 (e.g., in the negative dimension of Z axis of FIG. 1).

When the cap 20 is separated from the base 30, the spring 38 may maintain the first magnetic assembly in a first position where the first magnetic assembly 32 contacts the first contact 42 and the second contact 44 (not shown). In the first position, the first magnetic assembly 32 may close a circuit including the first contact 42 and the second contact

44. That is, in the first position, an impedance between the first contact 42 and the second contact 44 may be low (e.g., the first contact may be electrically coupled to the second contact 44 via the first magnetic assembly 32).

Because of the reduced magnetic reach of the second magnetic assembly 22 and the first magnetic assembly 32, the cap 20 and base 30 may only begin to significantly attract each other when the cap is in relative proximity (e.g., on the order of an inch away or less), and may thus generate less closing speed than may otherwise occur when using strong magnets. Thus, the cap 20 is unlikely to pinch fingers or surprise operators when reattaching it to the base 30. When the second magnetic assembly 22 is close enough to attract the first magnetic assembly 32, the attraction force may raise first magnetic assembly 32 and compress spring 38. Thus, in a second position of the first magnetic assembly 32 as shown in FIG. 1, an impedance between the first contact 42 and the second contact 44 may be high (e.g., the first contact may be electrically isolated from the second contact 44). The magnetic tether switch 10 illustrated in FIG. 1 may be an NO type magnetic tether switch.

The cap 20 may be held in place on the base 30 by the magnetic attraction of the first magnetic assembly 32 with the second magnetic assembly 22. In addition, cap 20 may have a rim 25 that fits over or in a step or protrusion of the base 30 to prevent the cap 20 from being pulled sideways off of the base 30. Using high strength magnets (e.g., rare-earth neodymium magnets or high-strength Alnico magnets), the cap 20 may be held in place with a disconnect force that is high enough for recreational vehicle or industrial applications. For example, a disconnect force of more than 10 lbs. has been achieved using the present design with a disk magnet (e.g., the second magnet 24) and a cylinder magnet (e.g., the first magnet 34) that are ⅝ inch in diameter, and a thickness of first flux return component 36 and second flux return component 26 of 1/16 inch. This design may, for example, be retrofitted to existing vehicles or industrial applications.

Figure 2:
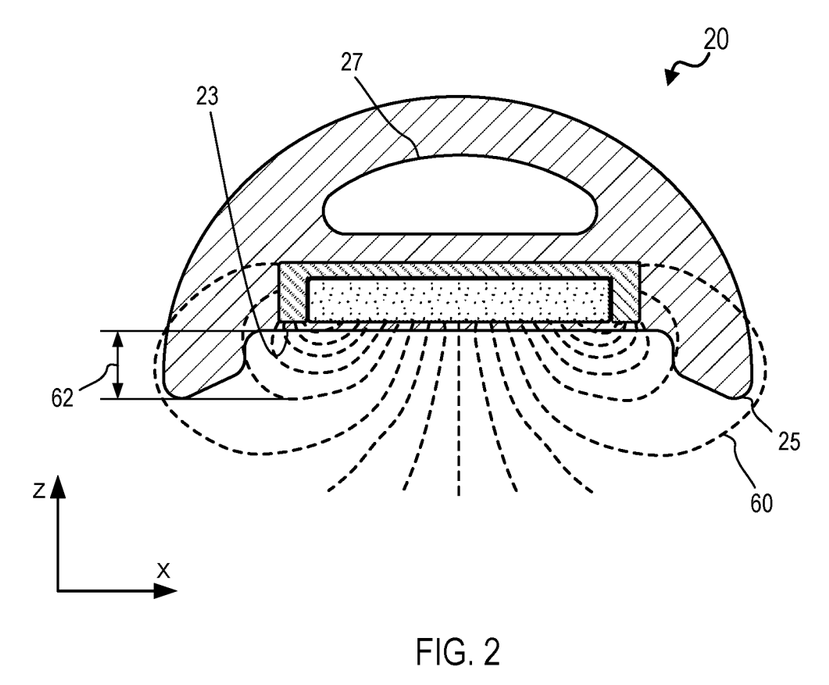
FIG. 2 illustrates a cross section of a cap removed from a base of magnetic tether switch, according to various aspects of the disclosure.

FIG. 2 illustrates the cap 20 removed from the base 30 of magnetic tether switch 10, according to various aspects of the disclosure. FIG. 2 illustrates magnetic flux lines 60 of second magnetic assembly 22 when separated from the first magnetic assembly 32 of base 30. As illustrated, the magnetic reach of second magnetic assembly 22 may be reduced (e.g., compared to a magnetic assembly without a flux return component) by the return of flux lines of the second magnet 24 via the second flux return component 26. The reduced magnetic reach of second magnetic assembly 22 may reduce the attraction of cap 20 to other ferrous surfaces. For example, cap 20 may include a rim 25 that protrudes a distance 62 from a bottom side 23 of the cap 20. The magnetic strength of second magnetic assembly 22 at the distance 62, when cap 20 is on a ferrous surface (not shown) may be similar to or less than the weight of cap 20. Thus, cap 20 may not strongly self-adhere to ferrous surfaces. Thus, when cap 20 is removed from base 30, the cap may not readily stick to other parts of the machine, equipment, or vehicle, or may be easily removed if it does stick to a part of the machine.

The second magnetic assembly 22 may be hermetically sealed within cap 20. For example, cap 20 may be formed of plastic or elastomer, which may be formed in one or more component parts around second magnetic assembly 22. Thus, second magnetic assembly 22 may not be exposed to environmental elements (e.g., water, snow, mud) that may typically adhere to magnetic or metallic components in harsh environments. In addition, if snow or mud does build up on the bottom of cap 20, it may be easily wiped clean by an operator with gloved hands. Hermetically sealing second magnetic assembly 22 may also prevent corrosion that may occur based on exposure of magnetic or metallic components to water.

Figure 3:
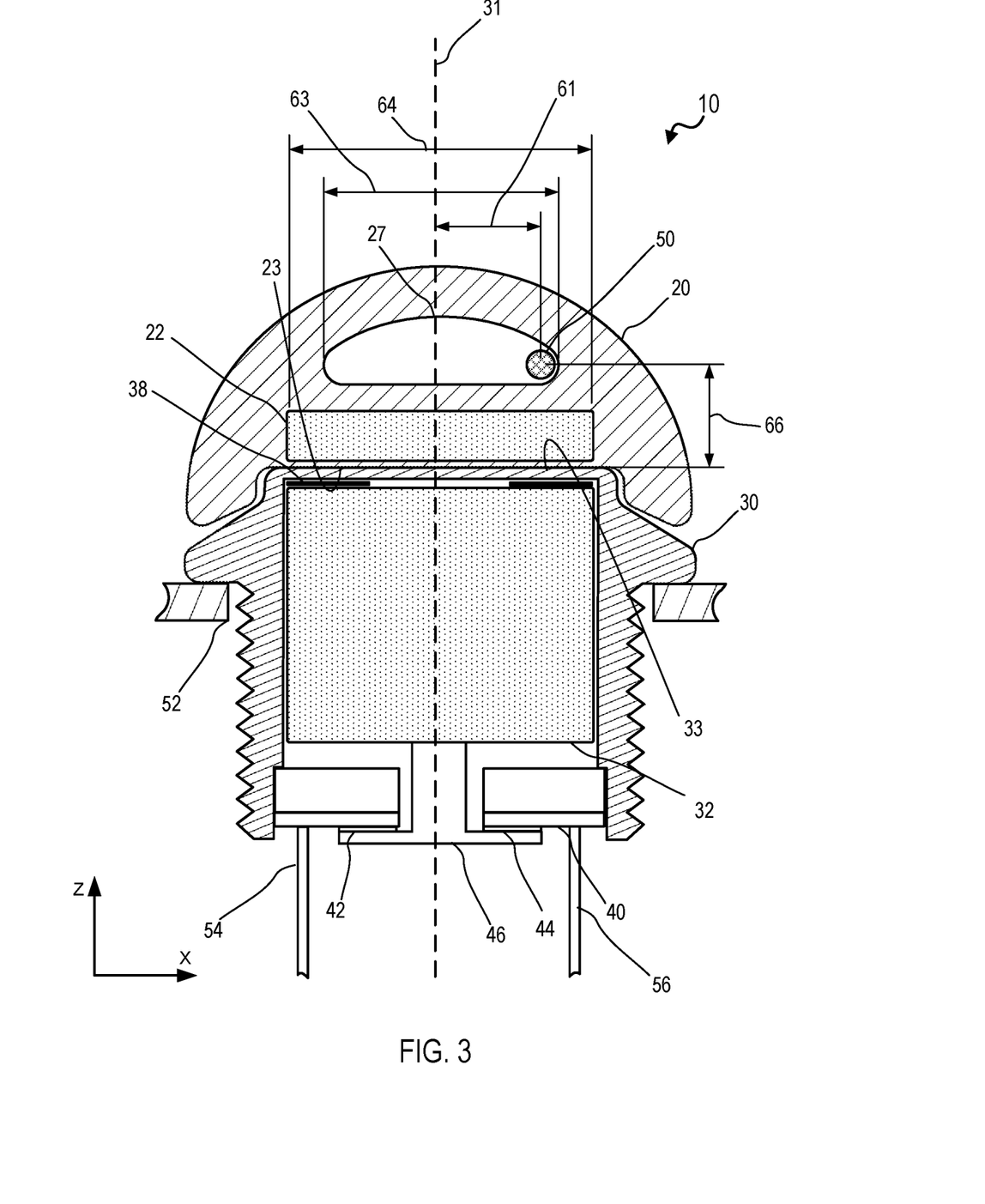
FIG. 3 illustrates a cross-section of a magnetic tether switch, according to various aspects of the disclosure.

FIG. 3 illustrates a cross-section of a magnetic tether switch 10, according to various aspects of the disclosure. For ease of understanding, first magnetic assembly 32 and second magnetic assembly 22 are illustrated in outline form in FIG. 3.

As shown in FIGS. 1-3, opening 27 of cap 20 may have an elongated shape in a direction parallel to the bottom side 23 of cap 20. In some cases, a distance 66 from the opening 27 to the bottom side 23 of cap 20 may be kept short to reduce the leverage that can be applied via tether 50 when pulled sideways relative to the cap 20. The reduced distance 66 may improve the consistency of force needed to pull cap 20 off of base 30. For example, if distance 66 approached the width 64 of the second magnetic assembly 22, the increased leverage would allow cap 20 to be pulled off of base 30 at a lower disconnect force when the force on tether 50 is applied at an angle approaching or exceeding a horizontal direction (e.g., parallel to the X axis or a negative angle compared to the X axis). In some examples, distance 66 is less than half of width 64, or less than one-third of width 64, or less than one quarter of width 64. Additionally or alternatively, a width 63 of the opening 27 may be restricted. For example, the width 63 of the opening 27 may be less than the width 64 of the magnetic assembly 32. In some cases, a distance 61 from a center 31 of the cap 20 to tether 50 may have a relationship to the width 64 of the magnetic assembly or the distance 66. However, opening 27 may allow tether 50 to move away from the center 31 (e.g., distance 61 may be greater than zero). For example, for force applied to tether 50 at a 45 degree angle (e.g., 45 degrees to the X and Z axes as shown), having distance 61 greater than zero may increase the force required to pull cap 20 off of base 30. In some examples, distance 61 may be between 0.25 times and 0.45 times of the width 64 of the second magnetic assembly 22 (e.g., the width 63 may be greater than 0.5 times the width 64 of the second magnetic assembly 22, but less than 0.9 times the width 64 of the second magnetic assembly 22).

FIG. 3 may illustrate an NC type of safety tether 10. For example, NC type safety tether 10 may include an extension 46 below first magnetic assembly 32 that extends through backing plate 40. When the cap 20 is separated from the base 30, the spring 38 may maintain the first magnetic assembly in a first position where the first magnetic assembly 32 is pushed away from the top side 33 of the base 30 (not shown), which moves extension 46 away from contacting contacts 42 and 44. Thus, in the first position the impedance between the first contact 42 and the second contact 44 may be high. When cap 20 is brought into proximity of the base 30, the first magnetic assembly 32 and the second magnetic assembly 22 may attract each other, which may raise first magnetic assembly 32 and compress spring 38 as shown in FIG. 3. Thus, in a second position of the first magnetic assembly 32 as shown in FIG. 3, an impedance between the first contact 42 and the second contact 44 may be low (e.g., the first contact may be electrically coupled to the second contact 44).

Figure 4A:
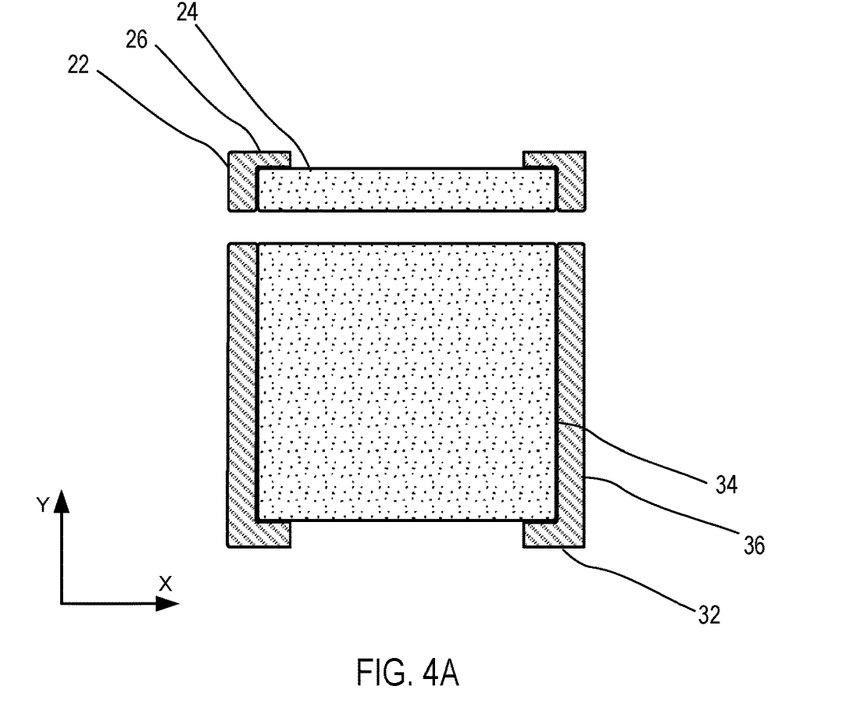
FIG. 4A illustrates cross sections of alternative examples of a first magnetic assembly and a second magnetic assembly, according to various aspects of the disclosure.
Figure 4B:
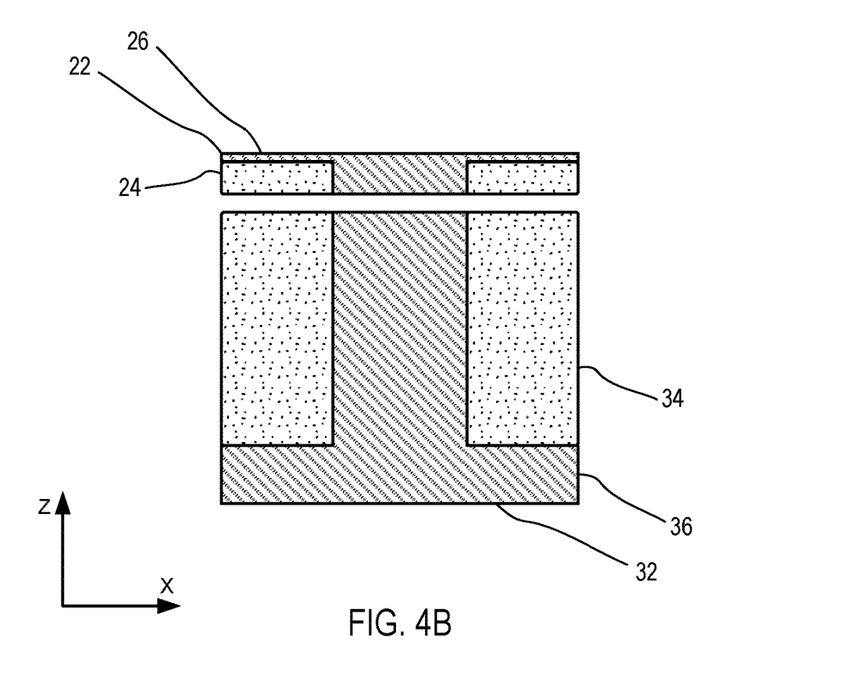
FIG. 4B illustrates cross sections of first magnetic assembly and second magnetic assembly formed with ring magnets and ferrous cores, according to various aspects of the disclosure.

FIGS. 4A and 4B illustrate cross sections of alternative examples of first magnetic assembly 32 and second magnetic assembly 22. As illustrated in FIG. 4A, second magnetic assembly 22 includes a second magnet 24 and a second flux return component 26 that is formed as a cap with a hole. That is, second flux return component 26 may not extend fully over the top side (e.g., side that is opposite of the side of cap 20 that contacts base 30) of second magnet 24. Alternatively, second flux return component 26 may only extend along the sides of second magnet 24 (e.g., may not extend over the top side).

Similarly, first magnetic assembly 32 includes a first magnet 34 and a first flux return component 36 that is formed as a cap with a hole. That is, first flux return component 36 may not extend fully over the bottom side (e.g., side that is opposite of the side of base 30 that contacts cap 20) of first magnet 34. Alternatively, first flux return component 36 may only extend along the sides of first magnet 34 (e.g., may not extend over the bottom side).

In various examples, first magnetic assembly 32 and second magnetic assembly 22 may take a variety of combinations of one or more magnets or one or more magnets with a ferrous return element. For example, FIG. 4B illustrates cross sections of first magnetic assembly 32 and second magnetic assembly 22 formed with ring magnets and ferrous cores (e.g., reverse pot). Although illustrated with solid cores, the first magnetic assembly 32 or second magnetic assembly 22 may also have holes extending though them.

Figure 5:
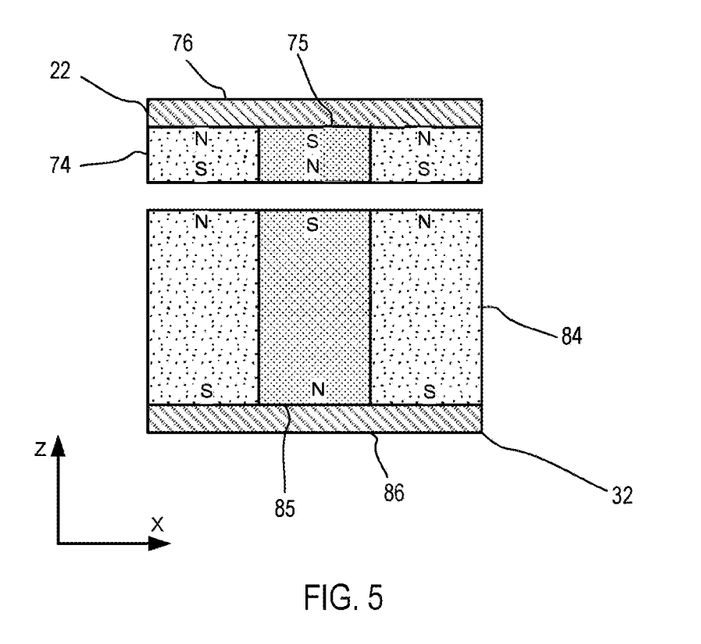
FIG. 5 illustrates cross sections of examples of a first magnetic assembly and a second magnetic assembly using multiple magnets, according to various aspects of the disclosure.

FIG. 5 illustrates cross sections of examples of first magnetic assembly 32 and second magnetic assembly 22 using multiple magnets. In FIG. 5, second magnetic assembly 22 is formed from a cylinder magnet 75 with a first polarity direction inside a ring magnet 74 with a second (e.g., opposite) polarity direction. Second magnetic assembly 22 may have a ferrous backing plate 76. Similarly, first magnetic assembly 32 is formed from a cylinder magnet 85 with a first polarity direction inside a ring magnet 84 with a second (e.g., opposite) polarity direction. First magnetic assembly 32 may have a ferrous backing plate 86. Although the ring magnets 74 and 84 are illustrated in FIG. 5 as having N polarities at the top, it should be understood that the polarities of the ring magnets and cylinder magnets may be inverted (e.g., ring magnets having S poles at the top and cylinder magnets having N poles at the top).

In some cases, first magnetic assembly 32 may be a different type of assembly from second magnetic assembly 22. For example, second magnetic assembly 22 may include a cylinder magnet and ring magnet (with or without the ferrous backing plate) as shown in FIG. 5, while first magnetic assembly 32 may include a ring magnet with a ferrous core as illustrated in FIG. 4B. In some examples, second magnetic assembly 22 may be replaced with a ferrous material (e.g., steel cylinder).

Figure 6:
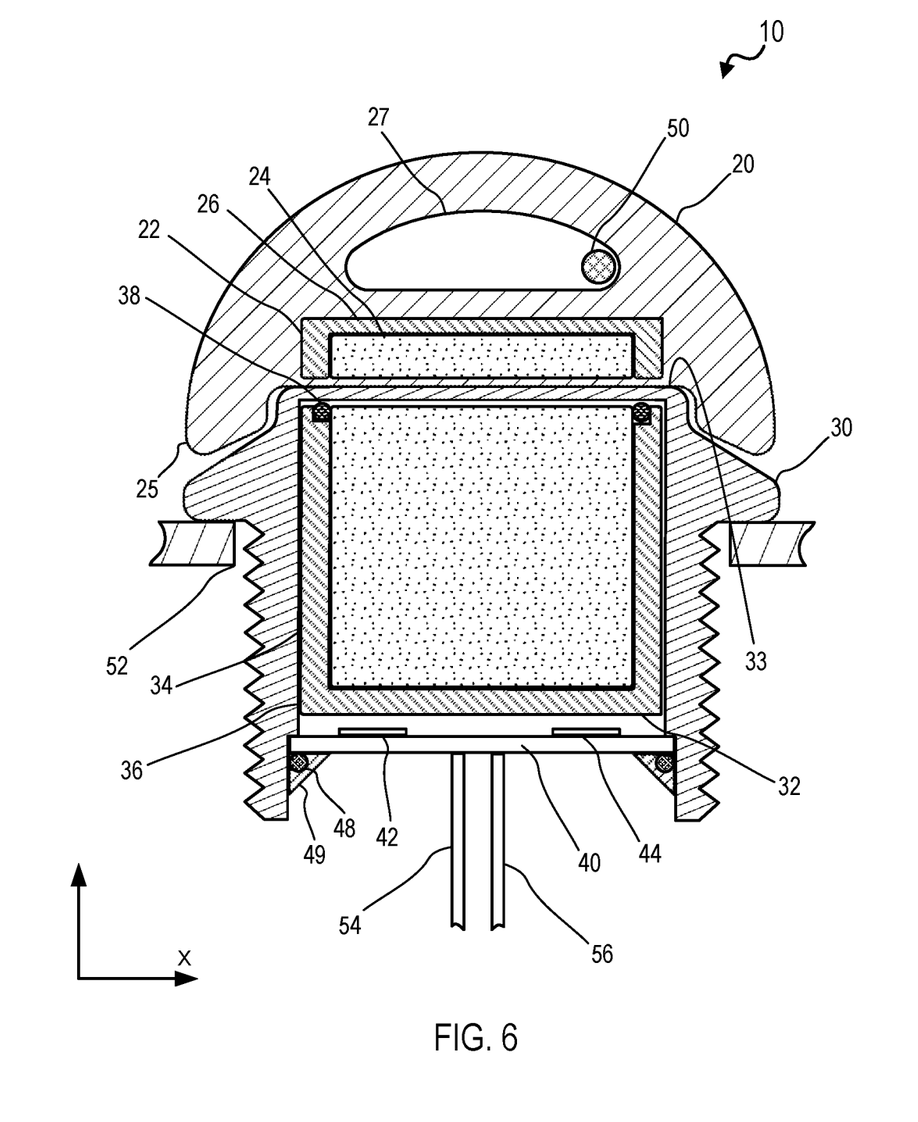
FIG. 6 illustrates a cross-section of a magnetic tether switch, according to various aspects of the disclosure.

FIG. 6 illustrates a cross-section of a magnetic tether switch 10, according to various aspects of the disclosure. In the magnetic tether switch 10 illustrated in FIG. 6, spring 38 is a coil type spring that is inserted within a notch of the first magnetic assembly 32. Although the notch is illustrated as within first flux return component 36, the notch may be located fully or partially within the first magnet 34, in some cases.

Also illustrated in FIG. 6 is an alternative arrangement for holding backing plate 40 in place. In FIG. 6, a lock-ring or snap-ring 48 is inserted behind backing plate 40 and may hold backing plate 40 in place. In some cases, an additional seal 49 (or potting material) may be used to secure lock-ring or snap-ring 48, and may hermetically seal the cavity of the base 30.

Figure 7:
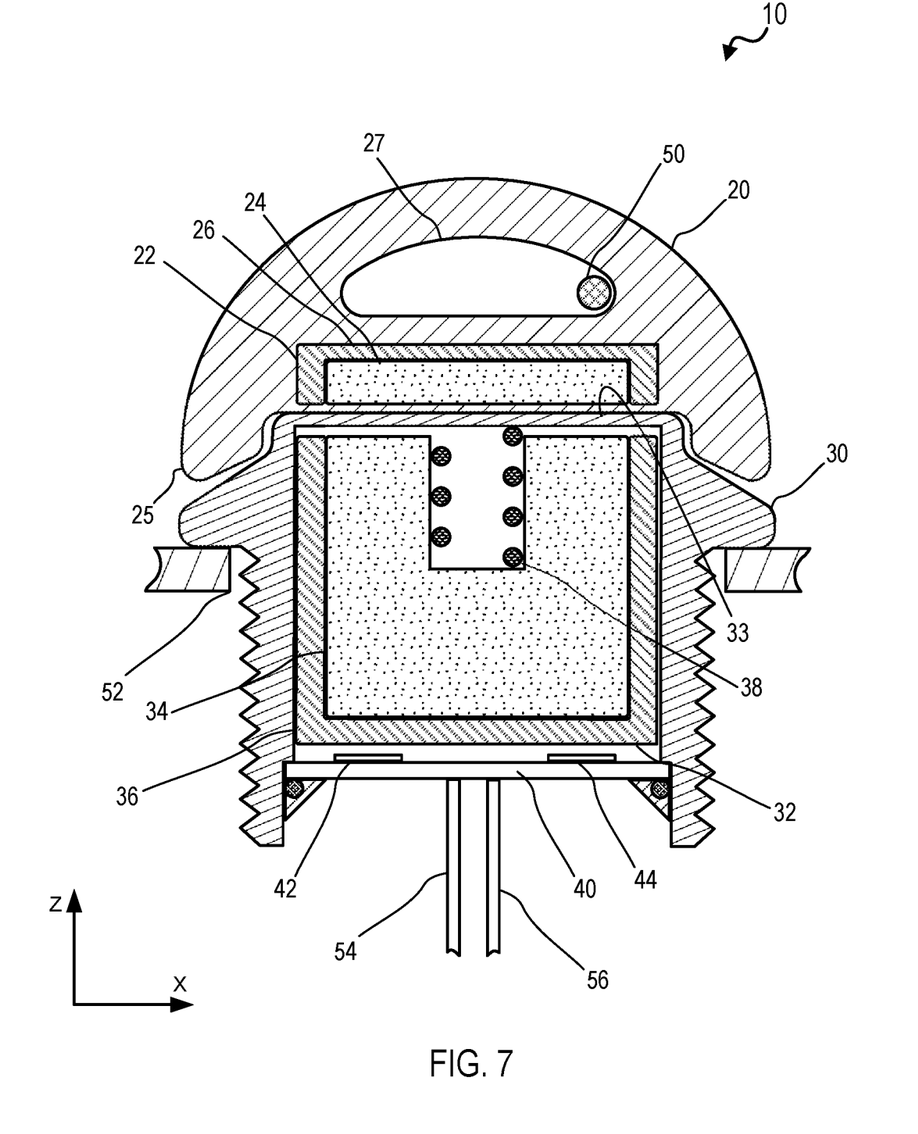
FIG. 7 illustrates a cross-section of a magnetic tether switch, according to various aspects of the disclosure.

FIG. 7 illustrates a cross-section of a magnetic tether switch 10, according to various aspects of the disclosure. In the magnetic tether switch 10 illustrated in FIG. 7, spring 38 is a coil type spring that is inserted within a void at the top of first magnetic assembly 32. Alternatively, multiple coil springs 38 may be used, each within a separate void of first magnetic assembly 32.

Figure 8:
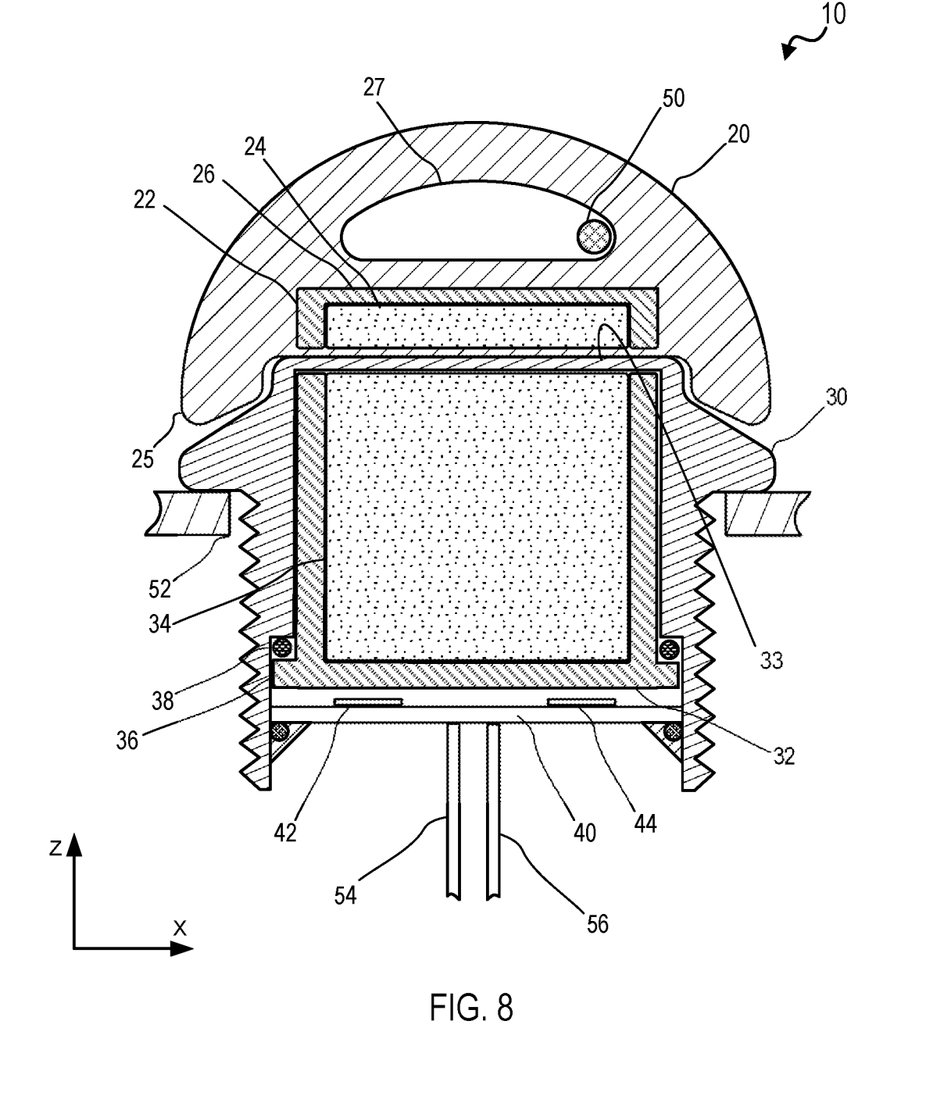
FIG. 8 illustrates a cross-section of a magnetic tether switch, according to various aspects of the disclosure.

FIG. 8 illustrates a cross-section of a magnetic tether switch 10, according to various aspects of the disclosure. In the magnetic tether switch 10 illustrated in FIG. 8, spring 38 is a coil type spring that is inserted at a step of cavity within base 30, with the first magnetic assembly 32 including a protrusion to contact spring 38. Alternatively in the arrangement shown in FIG. 8, spring 38 may be one or more leaf type springs.

Figure 9:
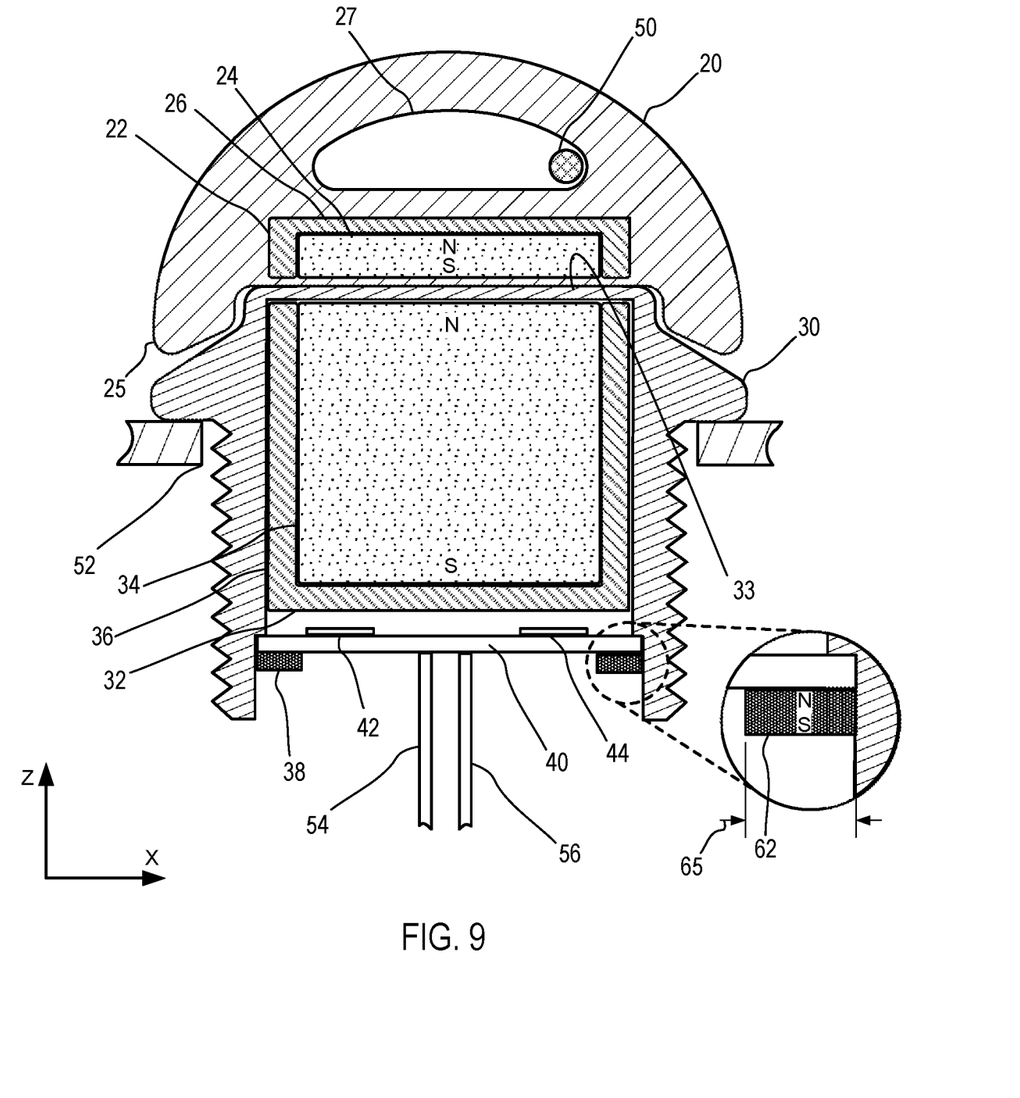
FIG. 9 illustrates a cross-section of a magnetic tether switch, according to various aspects of the disclosure.

FIG. 9 illustrates a cross-section of a magnetic tether switch 10, according to various aspects of the disclosure. In the magnetic tether switch 10 illustrated in FIG. 9, the state retention component 38 for retention of the first magnetic assembly 32 in the second state when the cap 20 is not attached to the base 30 is provided with a third magnetic assembly 62.

In the illustrated example, the third magnetic assembly 62 is a ring magnet that is located below the first magnetic assembly 32 (e.g., mounted at the underside of the backing plate 40). In the example illustrated in FIG. 9, the polarization of third magnetic assembly 62 is illustrated as having a first polarity (e.g., N) at the top of the third magnetic assembly 62 being opposite of a second polarity (e.g., S) corresponding to the bottom of the first magnet 34.

In some examples, the third magnetic assembly 62 may have an outer dimension (e.g., diameter) approximately equal to the outer dimension of the first magnetic assembly 32. In addition, a width 65 of the third magnetic assembly 62 may be approximately equal to the thickness of first flux return component 36. However, other dimensions are possible including being located within or outside the outer dimension of the first magnetic assembly 32, and being wider or narrower. The pull force of the third magnetic assembly 62 may be sufficient to maintain the first magnetic assembly 32 in the second state when the cap 20 is not attached to the base 30. For example, the pull force between the first magnetic assembly 32 and the third magnetic assembly 62 may be a factor (e.g., 1.5×, 2×, 2.5×, 3×) of the weight of the first magnetic assembly 32, thus maintaining the first magnetic assembly 32 in the second state even when the base 30 is inverted (e.g., a vehicle is in an overturned condition). However, the pull force between the first magnetic assembly 32 and the third magnetic assembly 62 may be substantially less than the pull force between the first magnetic assembly 32 and the second magnetic assembly 22, and thus when the cap 20 is installed on the base 30, the pull force between the first magnetic assembly 32 and the second magnetic assembly 22 may overcome the pull force of the third magnetic assembly 62, to switch the first magnetic assembly 32 to the first state (e.g., separated from contacts 42 and 44).

In one example, the pull force between the first magnetic assembly 32 and the second magnetic assembly 22 may be approximately 10 lbs, while the third magnetic assembly 62 may have a pull force of 1.5 lbs. In some examples, a reduction of the pull force between the first magnetic assembly 32 and the second magnetic assembly 22 due to the third magnetic assembly 62 may be less than a reduction of the pull force due to use of a spring 38 as shown in FIGS. 1, 3, 6, 7, and 8. In some examples, the reduction of the pull force between the first magnetic assembly 32 and the second magnetic assembly 22 due to the third magnetic assembly 62 may be less than the pull force of the third magnetic assembly 62 (e.g., due to the change in distance between the first magnetic assembly 32 and the third magnetic assembly 62 when the second magnetic assembly 22 attracts the first magnetic assembly 32 to the top of the cavity in the base 30). Thus, magnetic tether switch 10 with third magnetic assembly 62 may advantageously improve the pull force of the cap 20 relative to the base 30 in the first state (e.g., with the cap 20 attached to the base 30) with approximately equal retention force of the first magnetic assembly 32 in the second state (e.g., with the cap 20 not attached to the base 30).

In some examples, the pull force between the first magnetic assembly 32 and the second magnetic assembly 22 may increase due to the third magnetic assembly 62. That is, although providing a force to maintain the first magnetic assembly 32 in the second state when the cap 20 is not attached to the base 30, the third magnetic assembly 62 may contribute to the pull force between the first magnetic assembly 32 and the second magnetic assembly 22 when the cap 20 is attached to the base 30 (e.g., due to changes in magnetic flux lines when the first magnetic assembly 32 is proximate to the second magnetic assembly 22). Thus, magnetic tether switch 10 with third magnetic assembly 62 may advantageously improve pull force of the cap 20 relative to the base 30 while the first magnetic assembly 32 is in the first state (e.g., the cap 20 attached to the base 30), while providing retention of the first magnetic assembly 32 in the second state (e.g., with the cap 20 not attached to the base 30).

Although illustrated using the cup type flux return components for the first magnetic assembly 32 and the second magnetic assembly 22, retention of the first magnetic assembly 32 in the second state when the cap 20 is not attached to the base 30 using third magnetic assembly 62 may be used with other types of magnetic assemblies including those illustrated in FIGS. 4A, 4B, 5, and the like.

The detailed description set forth above in connection with the appended drawings describes exemplary embodiments and does not represent the only embodiments that may be implemented or that are within the scope of the claims. The term "example" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

The functions described herein may be implemented in various ways, with different materials, features, shapes, sizes, or the like. Other examples and implementations are within the scope of the disclosure and appended claims. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used in the present disclosure, the terms "parallel," "orthogonal," or "perpendicular" are not intended to suggest a limitation to precise geometric parallelism. For instance, the term "parallel" as used in the present disclosure is intended to include typical deviations from geometric parallelism relating to such considerations as, for example, manufacturing and assembly tolerances. Further, certain manufacturing process such as molding or casting may require positive or negative drafting, edge chamfers and/or fillets, or other features to facilitate any of the manufacturing, assembly, or operation of various components, in which case certain surfaces may not be geometrically parallel, but may be parallel in the context of the present disclosure.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the widest scope consistent with the principles and novel features disclosed herein.

The invention claimed is:

1. An apparatus, comprising:
  a base comprising:
    a first housing having a top side;
    a first magnetic assembly slidably contained within a cavity of the first housing, wherein the first magnetic assembly comprises a first magnet and a first magnetic flux return component; and
  a cap comprising:
    a second housing having a bottom side; and
    a second magnetic assembly at least partially within the second housing, wherein the second magnetic assembly comprises a second magnet and a second magnetic flux return component, and wherein the second magnet comprises a first side adjacent to the bottom side of the second housing, a second side opposite the first side, and a third side between the first side and the second side, and wherein the second magnetic flux return component extends over the third side and at least part of the second side of the second magnet,
  wherein the base further comprises:
    a circuit comprising a plurality of contacts, wherein the first magnetic assembly connects the plurality of contacts together in one of a first state or a second state and disconnects the plurality of contacts from each other in the other of the first state or the second state, the first state corresponding to the first magnetic assembly being in a first position within the cavity when the cap is magnetically attached to the base and the second state corresponding to the first magnetic assembly being in a second position within the cavity when the cap is detached from the base; and
    a state retention component that holds the first magnetic assembly in the second state when the cap is not magnetically attached to the base.

2. The apparatus of claim 1, wherein the second magnetic flux return component extends fully over the second side of the second magnet.

3. The apparatus of claim 1, wherein the second magnetic assembly is composed of a ferrous material.

4. The apparatus of claim 1, wherein the state retention component comprises a spring.

5. The apparatus of claim 4, wherein the spring is located between the first housing and the first magnetic assembly.

6. The apparatus of claim 1, wherein the state retention component comprises a third magnetic assembly.

7. The apparatus of claim 6, wherein the third magnetic assembly comprises a ring magnet located below the first magnetic assembly.

8. The apparatus of claim 1, wherein the first magnet comprises a first side adjacent to the top side of the first housing, a second side opposite the first side, and a third side between the first side and the second side, and wherein the first magnetic flux return component extends over the third side and at least part of the second side of the first magnet.

9. The apparatus of claim 8, wherein the first magnetic flux return component extends fully over the second side of the first magnet.

10. The apparatus of claim 1, wherein the second magnetic assembly is hermetically sealed within the second housing.

11. The apparatus of claim 1, wherein the second housing comprises an opening having an elongated dimension parallel to the bottom side of the second housing.

12. The apparatus of claim 11, wherein a distance between the opening and the bottom side of the second housing is less than a dimension of the second magnetic assembly in a direction parallel to the bottom side of the second housing.

13. An apparatus, comprising:
a base comprising:
  a first housing having a top side; and
  a first magnetic assembly slidably contained within a cavity of the first housing, wherein the first magnetic assembly comprises a first magnet and a first magnetic flux return component; and
a cap comprising:
  a second housing having a bottom side, wherein the second housing comprises a housing extension that extends below the bottom side of the second housing by a first distance; and
  a second magnetic assembly at least partially within the second housing, wherein a magnetic field strength of the second magnetic assembly at the first distance is less than a weight of the cap,
wherein the base further comprises:
  a circuit comprising a plurality of contacts, wherein the first magnetic assembly connects the plurality of contacts together in one of a first state or a second state and disconnects the plurality of contacts from each other in the other of the first state or the second state, the first state corresponding to the first magnetic assembly being in a first position within the cavity when the cap is magnetically attached to the base and the second state corresponding to the first magnetic assembly being in a second position within the cavity when the cap is detached from the base; and
  a state retention component that holds the first magnetic assembly in the second state when the cap is not magnetically attached to the base.

14. An apparatus, comprising:
a base comprising:
  a first housing having a top side;
  a first magnetic assembly slidably contained within a cavity of the first housing, wherein the first magnetic assembly comprises a first magnet having a first polarity orientation and a second magnet having a second polarity orientation; and
a cap comprising:
  a second housing having a bottom side, wherein the second housing comprises a housing extension that extends below the bottom side of the second housing by a first distance; and
  a second magnetic assembly at least partially within the second housing, wherein a magnetic field strength of the second magnetic assembly at the first distance is less than a weight of the cap,
wherein the base further comprises:
  a circuit comprising a plurality of contacts (42, 44), wherein the first magnetic assembly connects the plurality of contacts (42, 44) together in one of a first state or a second state and disconnects the plurality of contacts (42, 44) from each other in the other of the first state or the second state, the first state corresponding to the first magnetic assembly being in a first position within the cavity when the cap is magnetically attached to the base and the second state corresponding to the first magnetic assembly being in a second position within the cavity when the cap is detached from the base; and
  a state retention component that holds the first magnetic assembly in the second state when the cap is not magnetically attached to the base.

15. The apparatus of claim 14, wherein the second magnetic assembly comprises a third magnet having the first polarity orientation and a fourth magnet having the second polarity orientation.

16. The apparatus of claim 14, wherein the second magnetic assembly is composed of a ferrous material.

17. The apparatus of claim 14, wherein the state retention component comprises a spring.

18. The apparatus of claim 17, wherein the spring is located between the first housing and the first magnetic assembly.

19. The apparatus of claim 14, wherein the state retention component comprises a third magnetic assembly.

20. The apparatus of claim 19, wherein the third magnetic assembly comprises a ring magnet located below the first magnetic assembly.

* * * * *